(12) United States Patent
Dupont et al.

(10) Patent No.: US 11,178,119 B2
(45) Date of Patent: Nov. 16, 2021

(54) UNIDIRECTIONAL COMMUNICATION SYSTEM AND METHOD

(71) Applicant: AIRBUS DEFENCE AND SPACE SAS, Toulouse (FR)

(72) Inventors: Gérard Dupont, Toulouse (FR); Olivier Lagarde, Toulouse (FR); Jean-Luc Marty, Toulouse (FR)

(73) Assignee: Airbus Defence and Space SAS, Toulouse (FR)

( * ) Notice: Subject to any disclaimer, the term of this patent is extended or adjusted under 35 U.S.C. 154(b) by 59 days.

(21) Appl. No.: 16/472,723

(22) PCT Filed: Dec. 21, 2017

(86) PCT No.: PCT/EP2017/084232
§ 371 (c)(1),
(2) Date: Jun. 21, 2019

(87) PCT Pub. No.: WO2018/115359
PCT Pub. Date: Jun. 28, 2018

(65) Prior Publication Data
US 2020/0412700 A1  Dec. 31, 2020

(30) Foreign Application Priority Data
Dec. 22, 2016 (FR) ...................................... 16 63262

(51) Int. Cl.
*H04L 29/02* (2006.01)
*H04L 29/12* (2006.01)
*H04L 29/06* (2006.01)

(52) U.S. Cl.
CPC ...... *H04L 63/0428* (2013.01); *H04L 63/0227* (2013.01); *H04L 63/105* (2013.01)

(58) Field of Classification Search
None
See application file for complete search history.

(56) References Cited

U.S. PATENT DOCUMENTS

| | | | |
|---|---|---|---|
| 8,065,725 B2* | 11/2011 | Zheng | H04L 63/1408 726/22 |
| 8,250,358 B2* | 8/2012 | Cheng | H04L 63/0209 713/153 |
| 10,049,227 B1* | 8/2018 | Sampson | G06F 21/6218 |
| 2008/0168135 A1* | 7/2008 | Redlich | G06F 21/6218 709/204 |

(Continued)

OTHER PUBLICATIONS

Starlight: Interactive Link. Anderson. IEEE. (Year: 1996).*
(Continued)

*Primary Examiner* — Venkat Perungavoor
(74) *Attorney, Agent, or Firm* — Nixon & Vanderhye P.C.

(57) ABSTRACT

A unidirectional communication system to allow the sending of alerts and notification to remote operators while relieving the problem of the protection of a secured network against cyberattacks when the secured network has a need to communicate information from the secured network to a public network. In practice, the solution is based on the use of a data diode (also known under the name of network diode) to allow unidirectional transmission of information from the secured network to a public network, which makes a computer attack on the secured network from the public network impossible. Further, because of a commanded data diode, no sensitive information can leak from the secured network via the system according to the invention. The transmission of the message is only done after the message to be sent has been cleaned of sensitive information and then encrypted.

10 Claims, 3 Drawing Sheets

(56) References Cited

U.S. PATENT DOCUMENTS

| | | | | |
|---|---|---|---|---|
| 2010/0205189 A1* | 8/2010 | Ebrahimi | ............ | G06F 21/6227 |
| | | | | 707/757 |
| 2012/0259877 A1* | 10/2012 | Raghunathan | ...... | G06F 21/6254 |
| | | | | 707/757 |
| 2015/0161397 A1 | 6/2015 | Cook et al. | | |
| 2016/0063269 A1 | 3/2016 | Liden et al. | | |
| 2016/0203264 A1* | 7/2016 | Danner | ................ | G06K 9/4609 |
| | | | | 382/128 |
| 2016/0321469 A1* | 11/2016 | Bhogal | ............... | G06F 21/6254 |
| 2016/0358013 A1* | 12/2016 | Carter | ..................... | G06F 21/32 |

OTHER PUBLICATIONS

Software Support for Common Criteria Security Development Process on the Example of a Data Diode. Rogowski. Springer (Year: 2014).*

Cybergateways for Securing Critical Infrastructures. Dornemann. Verlag. (Year: 2013).*

A Network Boundary Gap Technique Scheme Based on Dual Unilateral Path. Wang. IEEE. (Year: 2011).*

"Chapter 7: Establishing Secure Enclaves; Chapter 8: Exception, Anomaly, and Threat Detection; Chapter 9: Monitoring Enclaves ED—Eric D Knapp", Industrial Network Security, Security Critical Infrastructure Networks for Smart Grid, SCADA, and Other Industrial Control Systems, Syngress, Jan. 1, 2011, pp. 147-247.

Scott, et al., "Tactical Data Diodes in Industrial Automation and Control Systems", GIAC directory of certified professionals, May 18, 2015, pp. 1-32.

International Search Report for PCT/EP2017/084232 dated Feb. 7, 2018, 6 pages.

* cited by examiner

UNIDIRECTIONAL COMMUNICATION SYSTEM AND METHOD

This application is the U.S. national phase of International Application PCT/EP2017/084232 filed Dec. 21, 2017, which designated the U.S. and claims priority to French Patent Application 16 63262 filed Dec. 22, 2016, the entire contents of each of these applications is incorporated by reference.

TECHNICAL FIELD

The present invention relates to a system for communication from a secured network to a lower confidence network.

PRIOR ART

The ISO 22301 standard defines continuity of operation of an information system in use as the capacity thereof to continue providing products or delivering services at acceptable and previously defined levels after a disruptive incident. Also known under the acronym MOC for maintenance in operational condition, the continuity of activity of an information system in use aims to define all the methods and procedures necessary so that the information system remains fit for the use assigned to it throughout the time of use thereof.

In information systems characterized as critical, MOC represents a significant operating cost because it often requires the presence on-site of at least one maintenance technician who must be ready to act at any moment, upon detection of a disruptive incident. This configuration is especially dictated by the need for confidentiality of the information related to the operation of these systems.

In order to reduce the operating cost of the MOC, operators of critical information systems are more and more considering the use of remote monitoring, as is often the case for noncritical information systems. In practice, when a disruptive event occurs, a warning message is automatically sent to the on-call maintenance technician, for example by SMS text message, email or voice call over fixed or cellular telephone.

However, the adoption of remote monitoring of critical information systems via a public network does not inspire confidence in the operators involved. In fact, the mechanisms currently used for making on-call calls do not guarantee sufficient security of the interconnection between the information system and the public network, such that there are risks of computer intrusion and or loss of sensitive information.

It is therefore important to propose a solution with which to resolve these problems because such security problems can allow execution of computer attacks provoking, for example, the modification of the availability of the information system, unavailability thereof by saturation of these resources or allow, for example, retrieval of sensitive information from the information system.

BRIEF DESCRIPTION OF THE INVENTION

For that purpose, a first object of the invention relates to a communication system for transmission of at least one message from a first network of a first information system towards a second network of a second information system, where the first network has a higher security classification than the second network. In practice, the system comprises:

a system input connectable to the first network and intended for receiving the message, where the message comprises at least one first metadata related to the operation of the first information system;

a system output connectable to the second network;

an information analysis and filtering unit coupled to the system input and intended for generating a filtered message by filtering the message depending on a filtering signal such that at least one sensitive information related to the at least one first metadata is masked;

an information encryption unit coupled with the information analysis and filtering unit, and intended to generate an encrypted message by encrypting the filtered message depending on an encryption signal;

a data diode circuit coupled to the information encryption unit, and comprising a circuit input and a circuit output, where the data diode circuit is intended to unidirectionally transfer the encrypted message between the circuit input and the circuit output, and where the data diode circuit further comprises a command input and activation means for blocking or allowing the passage of the encrypted message between the circuit input and the circuit output depending on a command signal received at the command input;

a message sending unit coupled between the circuit output and the system output and intended to send a call message comprising the encrypted message; and a processor coupled to the information analysis and filtering unit, the information encryption unit and the circuit, and intended to generate the filtering signal, the encryption signal and the command signal.

In a first embodiment, the data diode circuit further comprises a data diode element having a transmission unit intended to send the encrypted message unidirectionally, where the activation means are intended to be actuatable between a first position in which the activation means are arranged so as to interrupt the supply of the transmission unit and a second position in which the activation means are arranged so as to activate the supply of the transmission unit.

In a second embodiment, the information analysis and filtering unit is further intended to generate a first operation termination signal indicating the completion of the information analysis and filtering unit operations. Further, the information encryption unit is further intended to generate a second operation termination signal indicating the completion of operations of the information encryption unit. Finally, the processor is further intended to generate the command signal in response to the successive generation of the first operation termination signal and the second operation termination signal.

In a third embodiment, the system further comprises:

a memory port coupled to the processor and intended to receive a portable memory; and a portable memory receivable in the memory port and configured for storing filtering data and encryption data. In this case, the processor is further intended to configure the filtering signal and the encryption signal, based on the filtering data and encryption data, respectively.

According to an example of the third embodiment:

the portable memory is further configured for storing at least one contact list comprising at least one call number for a mobile device to be contacted, where each call number is related to at least one second metadata related to the operation of the first information system;

the processor is further intended to include the contact list in the filtering signal;

the information analysis and filtering unit is further intended to generate a relationship message relating the filtered message and at least one call number for which the at least one second metadata matches the first metadata;

the information encryption unit is further intended to relate the relationship message to the encrypted message; and the message sending unit is further intended to send the call message depending on the relationship message.

In this case, preferably, the message sending unit is further intended to generate and send a periodic pulse message while waiting for a call message.

Advantageously, the message sending unit is further intended to destroy the call message following sending the call message.

In a specific arrangement, the message sending unit is configured for sending the call message by using a messaging protocol chosen among at least one of the following protocols: SMS, MMS, XMPP and SMTP.

In another specific arrangement:

the information analysis and filtering unit, the information encryption unit and the processor are included in a first enclosure;

the data diode circuit is included in a second enclosure; and the message sending unit is included in a third enclosure.

In this case, the first enclosure, second enclosure and third enclosure are geographically distinct from each other such that no electromagnetic radiation can be picked-up from one enclosure to another.

Advantageously:

the information analysis and filtering unit, the information encryption unit, the processor and the message sending unit are included in a first enclosure; and the data diode circuit is included in a second enclosure.

In this case, the first enclosure and second enclosure are geographically distinct from each other such that no electromagnetic radiation can be picked-up from one enclosure to another.

Finally, a second object of the invention relates to a method for transmission of at least one message from a first network of a first information system towards a second network of a second information system, where the first network has a higher security classification than the second network, and where the message comprises at least one first metadata related to the operation of the first information system. In practice, the method comprises the following steps:

generating a filtered message by filtering the message depending on a filtering signal such that at least one sensitive information related to the at least one first metadata is masked;

generating an encrypted message by encrypting the filtered message depending on an encryption signal;

unidirectionally transferring the encrypted message from the secured network to the unsecured network depending on a command signal, only when the filtering and encryption have been done.

BRIEF DESCRIPTION OF THE DRAWINGS

The characteristics and advantages of the invention will be better understood upon reading the following description and referring to the attached drawings, given for illustration and in no way limiting.

DESCRIPTION OF THE EMBODIMENTS

In the context of this description, information system is understood to mean all of the material means, software means, databases and communication networks that can be arranged for providing products or delivering services in a domain referred to as critical.

Further, critical domain is understood to mean the information systems for which a failure could have dramatic consequences, like death, serious injury, major material or economic losses, or serious consequences for the environment. Thus, this definition covers, for examples, transportation information systems (for example for piloting an aircraft, train, car or boat), energy information systems (for example for control of a nuclear power plant), health information systems (for example a medical device) or also for telecommunication information systems (for example a ground communication system for a satellite communication system). Just the same, any information system meeting the above definition is also considered in this description.

In the description, disruptive incident is also understood to mean all of the events connected with the operating state of an information system such as: the failure of a storage component, failure of supply to a motor of a device, drop of control voltage of a machine, drop of the power (e.g. hydraulic, electrical, etc.) received by a machine, and mechanical failure. Note however that the invention does not cover the detection and diagnosis of a disruptive incident. In the remainder of the description, it will be considered that an incident involving an information system was detected and diagnosed as being disruptive. The disruptive incident is next included in a message to be sent to a maintenance technician or a technical expert.

In the invention, a solution is proposed to the problem of the protection of a secured network against cyberattacks when the secured network has a need to communicate information from the secured network to a public network, for example by sending alerts and notifications to remote operators. In practice, the solution is based on the use of a data diode (also known under the name of network diode) to allow unidirectional transmission of information from the secured network to a public network. This has the effect of making a computer attack on the secured network from the public network impossible. Thus, this layout guarantees the physical separation between the secured network and the public network.

Figure 1:
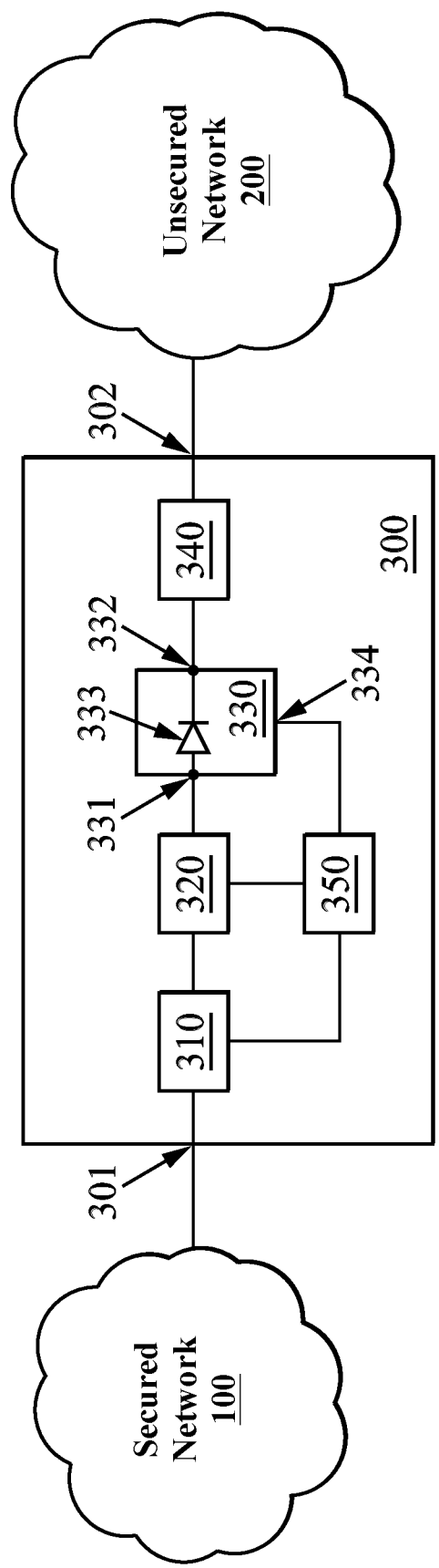
FIG. 1 shows an example embodiment of the system according to the invention.

FIG. 1 shows a system 300 according to the invention. In the example from FIG. 1, the system 300 is placed between the secured network 100 and an unsecured network 200. The secured network 100 is associated with a first information system whereas the unsecured network 200 is associated with a second information system different from the first information system. In general, the secured network 100 is considered as more secure than the unsecured network 200, because it has a higher security classification than that the unsecured network 200.

Structurally, the system 300 has a system input 301 and a system output 302. Further, the system 300 comprises an information analysis and filtering unit 310, an information encryption unit 320, a data diode circuit 330, a message sending unit 340 and a processor 350.

In the example from FIG. 1, the system input 301 is configured for being connected to the secured network 100 whereas the system output 302 is configured for being connected to the unsecured network 200. When the system 300 is in operation, the system input 301 is intended to receive a message comprising at least one metadata related to the operation of the first information system.

Message is understood to mean a set of digital signals placed in a predetermined format. For example, the message received at the system input 301 can be a text message according to the RFC-5424 standard or any other standard whether standardized or not. The message can comprise message identification elements, message generation time and date stamp, message source identification or even identification of the event having led to the generation of the message. However, other elements can be added to the message to be sent.

Here, metadata is understood to mean any information descriptive of the operation of the first information system. For example, in the transportation domain, it can involve data about failure of a storage component, the state of health of the engines or even the temperature of a part or component.

Returning to FIG. 1, the information analysis and filtering unit 310 is coupled to the system input 301. In operation, the information analysis and filtering unit 310 is configured for generating a filtered message by filtering the received message depending on a filtering signal. The filtering signal contains all the information allowing the information analysis and filtering unit 310 to determine the extent of the information to be filtered. In practice, the information analysis and filtering unit 310 filters the metadata from the message received from the system input 301 such that at least one item of sensitive information related to the metadata is masked. The effect of this is to prevent the leakage of sensitive information from the secured network 100.

Sensitive information is understood to mean information or knowledge obtained directly or indirectly that, if it were revealed to the public, would be harmful to the information system which it is about. In other words, it involves an item of information whose disclosure, misuse, modification or unauthorized access could unfavorably affect the security of the information system involved. For example, it could involve information related to the identification of the computer servers of the information system such as the IP addresses, server names or even the size of the computer servers. In fact, such information can, for example, provide information about the attack or defense capacities of the information system. In this case, if the sensitive information falls into the wrong hands, it could unfavorably affect the security of an organization.

In a first specific embodiment of the information analysis and filtering unit 310, the masking is done by removing sensitive information from the metadata. For example, the IP address of the server having experienced a disruptive incident can be removed from the metadata.

In a second embodiment of the information analysis and filtering unit 310, the masking is done by replacing sensitive information in the metadata with one or more items of non-sensitive information. For example, the name of the server having experienced a disruptive incident can be replaced with another name or an abbreviation different from the true server name. In this case, the one or more replacement words must be known to the operator who will receive the message. Another possibility of the same order can consist of replacing the sensitive information by a decoy for encoding sensitive information.

In a third embodiment of the information analysis and filtering unit 310, the masking is done by a combination of removing and replacing sensitive information. Thus, if metadata comprises the IP address and name of the server having experienced a disruptive incident, the solutions from the first embodiment and second embodiment can be used together. For example, the IP address can be replaced by an abbreviation and the server name can be removed from the metadata.

Still in FIG. 1, the information encryption unit 320 is coupled to the information analysis and filtering unit 310. In operation, the information encryption unit 320 is configured for generating an encrypted message by encrypting the filtered message depending on an encryption signal. The encryption signal contains all the information allowing the information encryption unit 320 to encrypt the filtered information. In practice, the encryption can be done using any encryption means known to the person skilled in the art, in particular by using a symmetric or asymmetric algorithm. The effect of this is to prevent interception of notification messages issued from the secured network 100.

Again, in FIG. 1, the data diode circuit 330 is coupled to the information encryption unit 320. The data diode circuit 330 comprises a circuit input 331, a circuit output 332 and a data diode element 333. In operation, the data diode element 333 is configured for unidirectionally transferring the encrypted message between the circuit input 331 and the circuit output 332. In fact, the data diode element 333, which is also known under the name of network diode, is a system which allows interconnecting two computer networks by allowing data transfer in only one direction. This type of system is generally used for connecting a network requiring a high security level to a lesser confidence network (for example the Internet). In this case, only the passing on of information from the lower confidence network is authorized in order to guarantee the confidentiality of the secured network by avoiding leaks of sensitive information. However, in the context of the invention, the use of the data diode element 333 in the opposite direction is intended such that only passing on of information from the secured network is possible. This has the effect of making it impossible to implement computer attacks from outside the secured network, because there is only a route for communication from the secured network to the lesser confidence network and not in the other direction.

Further, in FIG. 1, the data diode circuit 330 comprises a command input 335 and activation means 334 for blocking or allowing passage of the encrypted message between the circuit input 331 and the circuit output 332 depending on a command signal received at the command input 335. The activation means 334 are intended to be actuatable between a first position in which the activation means 334 block the passage of the encrypted message, and a second position in which the activation means 334 allow the passage of the information. Finally, the activation means 334 are normally actuated in the first position.

Figure 2:
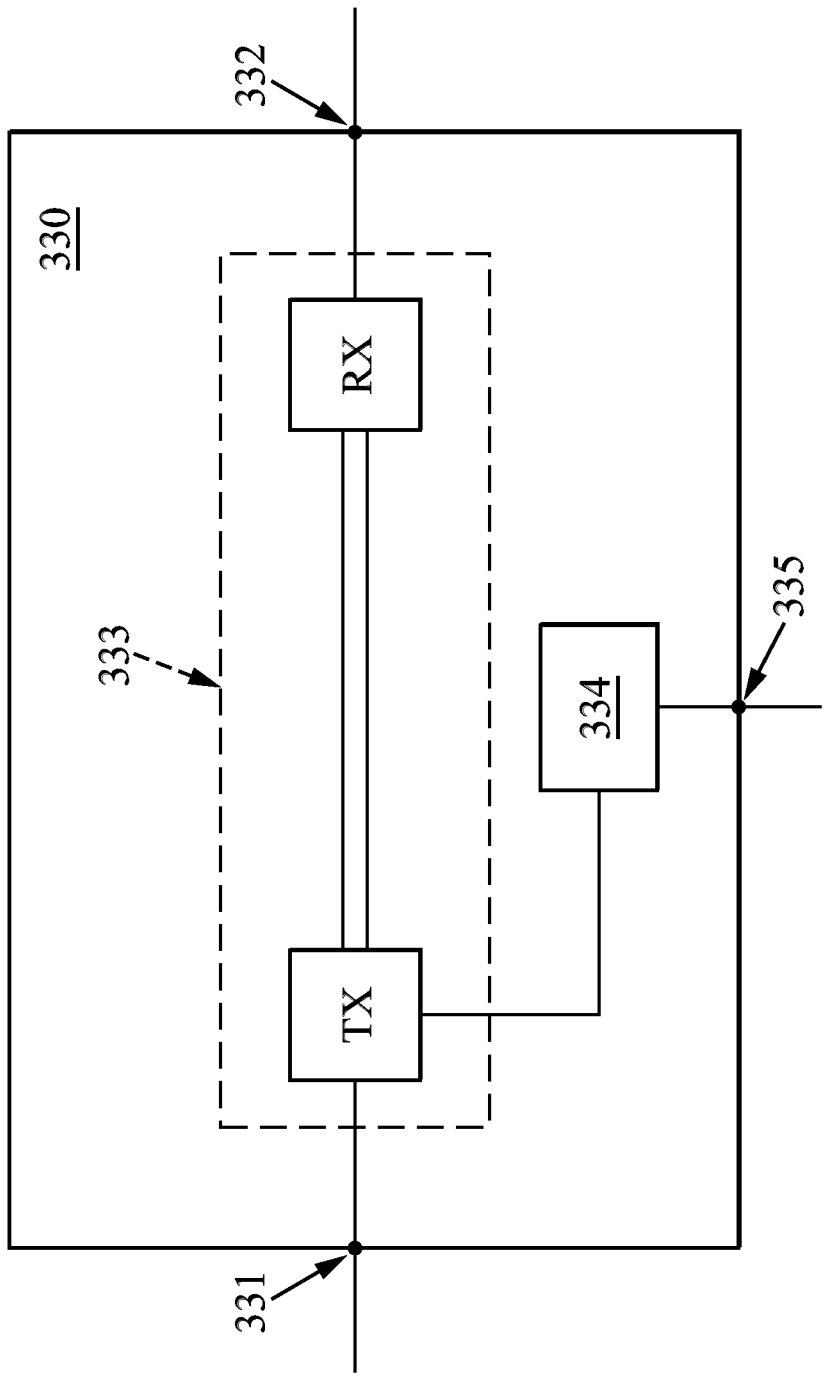
FIG. 2 shows an embodiment of the data diode circuit according to the invention.

FIG. 2 shows a specific embodiment of the data diode circuit 330 according to the invention. In the example from FIG. 2, the data diode element 333 from the data diode circuit 330 comprises a transmission element TX and a receiving element RX, both provided in combination for unidirectional transmission of the encrypted message between the transmission element TX and the receiving element RX. In an example, the data diode element 333 is implemented on the basis of an optical fiber comprising only a single strand. In this case, the transmission element TX can be a light source intended for emitting a light flow in the optical fiber and the receiving element RX can be a photoreceptor intended for receiving the light flow. However other unidirectional network link implementations can also be used with the invention. For example, use of a partial RS-232 serial link or even a partial RJ-45 ethernet link with corresponding transmitting and receiving elements is conceivable.

In a specific embodiment from FIG. 2, the means of activation 334 are actuated in a first position by commanding the interruption of the supply to the transmission element TX whereas the activation means 334 are actuated in the second position by commanding the activation of the supply to the transmission element TX. To do that, the activation means 334 can be directly connected to the supply for the transmission element TX.

Returning to FIG. 1, the message sending unit 340 is coupled between the circuit output 332 and the system output 302. In operation, the message sending unit 340 is configured for sending a call message comprising the encrypted message. In a specific embodiment, the message sending unit 340 is configured for sending the call message by using a messaging protocol chosen among at least one of the following protocols: SMS, email, MMS, XMPP, etc. Also, for better security, no copy of the message sent is retained in the system 300.

In a specific embodiment, the message sending unit 340 is further intended to destroy the call message following sending the call message.

In an example of the previous embodiment, the message sending unit 340 is intended to receive an acknowledgment message in response to sending the call message and to destroy the call message in response to the message acknowledging reception.

In another specific embodiment, the message sending unit 340 is further intended to generate and send a periodic pulse message (i.e. "heartbeat" or "keep alive" message) while waiting for a call message. The pulse message is intended to indicate to the recipient of the message that the system 300 is still running. In other words, the periodic pulse message indicates to the message recipient that the system 300 continues to be active. In an example, the period for generating and sending the pulse message can be set at every minute, every half hour or every hour. In a specific embodiment, the periodic pulse message is encrypted and arranged such that it is not possible to intercept and thus be able to simulate the presence of the system 300 by replaying a transmission sequence of the already used periodic pulse message.

Finally, in FIG. 1, the processor 350 is coupled to the information analysis and filtering unit 310, the information encryption unit 320 and the data diode circuit 330. In operation, the processor 350 is configured for generating the filtering signal, encryption signal and command signal.

In a first embodiment of the processor 350, all of the information with which to configure the filtering signal, encryption signal and command signal are included in a memory of the processor 350. In this case, the processor 350 is what orders the generation of the filtering, encryption and command signals. In the context of this specific embodiment, it is understood that the filtering signal is generated before the encryption signal so as to generate the command signal actuating the activation means 334 in the second position only when the masking and filtering operations have been done. For example, the processor 350 can generate the encryption signal, on the one hand, and the command signal on the other, after a set time delay following generation of the filtering signal, on the one hand, and the encryption signal on the other. In this way, it can be guaranteed that the information sent was previously filtered of all sensitive information and encrypted.

In a second implementation of the processor 350, the generation of the command signal is conditional on the execution of the operations of the information analysis and filtering unit 310 and then of the information encryption unit 320. In practice, the information analysis and filtering unit 310 is further intended to generate a first operation termination signal indicating the completion of the information analysis and filtering unit 310 operations. It is the same for the information encryption unit 320 which is further intended to generate a second operation termination signal indicating the completion of operations of the information encryption unit 320. Finally, the processor 350 is further intended to generate the command signal in response to the generation of the first operation termination signal and the second operation termination signal. In the context of this specific embodiment, it is understood that the first operation termination signal is generated before the second operation termination signal so as to generate the command signal actuating the activation means 334 in the second position only when the masking and filtering operations have been done. In this way, it can be guaranteed that the information sent was previously filtered of all sensitive information and encrypted.

In another specific embodiment of the system 300, a memory port and portable memory are incorporated. In this embodiment, the memory port is coupled to the processor 350 and configured for receiving the portable memory. Further, the portable memory is configured for storing filtering data and encryption data. Finally, the processor 350 is suited for configuring, respectively, the filtering signal and the encryption signal based on filtering data and encryption data. Thus, in this specific embodiment, the data with which to configure the filtering signal and the encryption signal are obtained from the portable memory. This offers the owners of the secured information system 100 the possibility of determining the way in which the filtering and encryption must be done.

In an example of this specific implementation of the system 300, the portable memory can also be configured for storing command data usable by the processor 350 for configuring the command signal.

In an example of the preceding implementation, the portable memory is further configured for storing at least one contact list comprising at least one call number for a mobile or fixed device to contact. In this example, each call number is related to at least one second metadata about operation of the secure network 100. Further, the processor 350 is also intended to include the contact list in the filtering signal. Additionally, the information analysis and filtering unit 310 is also configured to generate a relationship message relating the filtered message and at least one call number for which the second metadata matches the first metadata. The effect of this layout is to allow the notification of the occurrence of an incident to the one or several most appropriate technicians for resolving the incident.

It will be said that the first metadata and second metadata match when they both comprise information about the same incident disrupting the secured network 100. For example, if the first metadata comprises information indicating that a failure of a storage component has occurred, then a second metadata which matches the first metadata also comprises information about the failure of a storage component. In practice, since each call number is related to a technician specialized in one or more disruptive incidents of the secured network 100, then the objective of matching according to the invention is to limit the call list to only numbers related to technicians specialized in the disruptive incident which occurred.

In a specific embodiment, setting up a match table with which to relate a technical specialty to a disruptive incident can be considered. For example, all failures of the first information system which are linked to mechanics can be matched with the technical specialty of a mechanic. Thus, because of the matching table and the contact list, the information analysis and filtering unit 310 can determine the one or more pertinent call numbers which are related to the occurrence of a specific disruptive incident by matching the disruptive incident to a specific technical specialty. In practice, storing the match table in a memory of the information analysis and filtering unit 310 or even in the processor 350 can be considered.

In another example from the previous embodiment, outsourcing the functionality with which to determine the one or more relevant call numbers which are related to the occurrence of a specific disruptive incident to a distinct unit from the information analysis and filtering unit 310 can be considered. For example, a routing unit coupled to the analysis unit can be used. In this case, the routing unit can comprise a memory and also a processor. The memory can also comprise the contact list and the match table, both mentioned above. In a specific example, the information analysis and filtering unit 310 is configured for providing the routing unit the second metadata about the operation of the secured network 100. Subsequently, the routing unit is configured for determining at least one call number for which the second metadata matches the first metadata and returning it to the information analysis and filtering unit 310. Further, the routing unit is also configured for determining the one or more pertinent call numbers which are related to the occurrence of a specific disruptive incident by matching the disruptive incident to a specific technical specialty and returning it to the information analysis and filtering unit 310.

Subsequently, the information encryption unit 320 is also configured to relate the relationship message to the encrypted message. Finally, the message sending unit 340 is also configured to send the call message depending on the relationship message. In another example of this embodiment, including the contact list in a memory of the processor 350 can be considered.

In an embodiment of the invention, physically laying out the various elements of the system 300 according to several arrangements can be considered.

For example, in a first arrangement, the information analysis and filtering unit 310, the information encryption unit 320 and the processor 350 are gathered in a first enclosure. Next, the data diode circuit is included in a second enclosure distinct from the first enclosure. Finally, the message sending unit 340 is positioned in a third enclosure distinct from the first enclosure and second enclosure. In this arrangement, the first enclosure, second enclosure and third enclosure can be geographically distinct from each other such that no electromagnetic radiation can be picked-up from one enclosure to another.

In a second arrangement, the information analysis and filtering unit 310, the information encryption unit 320, the processor 350 and the message sending unit 340 are gathered in a first enclosure. Next, the data diode circuit 330 is positioned in a second enclosure distinct from the first enclosure. In this arrangement, the first enclosure and second enclosure are geographically distinct from each other such that no electromagnetic radiation can be picked-up from one enclosure to another.

In the description, it was considered that the information sent from the secured network 100 to the unsecured network 200 were linked to a malfunction of the first information system. The effect of this was to allow setting up remote on-call corrective maintenance of the first information system through a public network. However, because of the invention, some information which is not necessarily connected with the malfunction of the first information system can also be sent outside of the system. In this case, the information analysis and filtering unit 310 should be configured to allow the corresponding information to pass. The effect of this will be to allow setting up remote supervision of the first information system.

The invention also relates to a sender (not shown) for a wired or wireless type communication system comprising the system 300 such as described above. With such a sender, an encrypted unidirectional communication can be established through any communication network and in particular through a public network.

Figure 3:
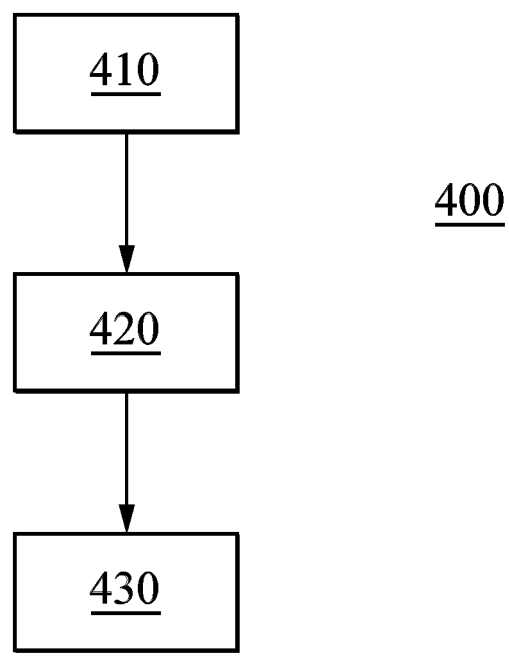
FIG. 3 shows a process diagram of a method according to the invention.

The invention also relates to a method 400 for sending at least one first metadata from the secured network 100 towards the unsecured network 200 according to the technical aspects described above. In FIG. 3, the method 400 comprises the following steps consisting of:

generating a filtered message 410 by filtering the first metadata depending on the filtering signal such as described above, such that at least one sensitive information related to the first metadata is masked;

generating an encrypted message 420 by encrypting the filtered message depending on the encryption signal such as described above;

unidirectionally transferring 430 the encrypted message from the secured network 100 to the unsecured network 200, conditionally, by commanding the passage of the encrypted message depending on the command signal such as described above.

The invention described provides a solution to the problem of the protection of a secured network against cyberattacks when the secured network has a need to communicate information from the secured network to a public network. In fact, overall, the system according to the invention is difficult to be compromised by a cyberattack. More specifically, only the message sending unit could be compromised or damaged by such an attack. However, since this unit is positioned downstream from the physical security limit of the system (meaning after the data diode circuit), loss thereof then has no impact on the overall security of the secured network. Thus, the addition of a system according to the invention to an existing information system does not provide an opportunity for implementing a cyberattack against the network of this information system. Further, because of the use of the commanded data diode circuit, it is also guaranteed that no sensitive information could leak from the secured network via the system according to the invention. The concept of "data thyristor" can also be used. In fact, since the thyristor allows unidirectional conduction of the current because of the command of a latch, the "data thyristor" allows unidirectional transmission a message after the message to be sent has been cleaned of sensitive information and then encrypted. In this case, the message takes the place of the current, whereas the confirmation information from the cleaning and encryption of the message service latch for the thyristor.

The invention claimed is:

1. A communication system for transmission of at least one message from a first network of a first information system towards a second network of a second information system, where the first network has a higher security classification than the second network, the communication system comprising:
- a system input connectable to the first network and configured to receive the at least one message, where the at least one message comprises at least one first metadata related to the operation of the first information system;
- a system output connectable to the second network;
- a filter configured to generate a filtered message by filtering the at least one message depending on a filtering signal such that at least one sensitive information related to the at least one first metadata is masked;
- an encryption unit coupled with the filter, and configured to generate an encrypted message by encrypting the filtered message depending on an encryption signal;
- a data diode circuit comprising a circuit input and a circuit output,
  - wherein said data diode circuit input is coupled to the encryption unit,
  - wherein the data diode circuit is configured to allow data transfer only from the circuit input towards the circuit output and block data transfer from the circuit output towards the circuit input,
  - wherein the data diode circuit is configured to unidirectionally transfer the encrypted message between the circuit input and the circuit output, and
  - wherein the data diode circuit further comprises a command input and activation unit configured to block or allow passage of the encrypted message between the circuit input and the circuit output depending on a command signal received at the command input;
- a message sending unit coupled between the circuit output and the system output, and configured to send a call message comprising the encrypted message; and
- a processor coupled to the filter, the encryption unit and the data diode circuit, and configured to generate the filtering signal, the encryption signal, and the command signal, wherein the processor includes a memory.

2. The system according to claim 1 wherein, the data diode circuit further comprises a data diode element having a transmission unit configured to send the encrypted message unidirectionally, where the activation unit is configured to be actuatable between a first position in which the activation unit is arranged to interrupt a supply of the transmission unit and a second position in which the activation unit is arranged to activate the supply of the transmission unit.

3. The system according to claim 1, wherein:
- the filter is further configured to generate a first operation termination signal indicating the completion of the information analysis and filtering unit operations;
- the encryption unit is further configured to generate a second operation termination signal indicating the completion of operations of the information encryption unit; and
- the processor is further configured to generate the command signal in response to the successive generation of the first operation termination signal and the second operation termination signal.

4. The system according to claim 1, further comprising:
- a memory port coupled to the processor and configured to receive a portable memory; and
- a portable memory receivable in the memory port and configured for storing filtering data and encryption data;
- wherein, the processor configures the filtering signal and the encryption signal, based on the filtering data and encryption data, respectively.

5. The system according to claim 4, wherein:
- the portable memory is further configured to store at least one contact list comprising at least one call number for a mobile device to be contacted, where each call number is related to at least one second metadata related to the operation of the first information system;
- the processor is further configured to include the contact list in the filtering signal;
- the filter is further configured to generate a relationship message relating the filtered message and at least one call number for which the at least one second metadata matches the first metadata;
- the encryption unit is further configured to relate the relationship message to the encrypted message; and
- the message sending unit is further configured to send the call message depending on the relationship message.

6. The system according to claim 5 wherein the message sending unit is further configured to generate and send a periodic pulse message while waiting for a call message.

7. The system according to claim 1, wherein the message sending unit is further configured to destroy the call message following sending the call message.

8. The system according to claim 1, wherein the message sending unit is configured for sending the call message by using a messaging protocol chosen among at least one of the following protocols: SMS, MMS, XMPP and SMTP.

9. The system according to claim 1, wherein:
- the filter, the encryption unit and the processor are included in a first enclosure;
- the data diode circuit is included in a second enclosure; and
- the message sending unit is included in a third enclosure;
- wherein the first enclosure, second enclosure and third enclosure are geographically distinct from each other such that no electromagnetic radiation can be picked-up from one enclosure to another.

10. The system according to claim 1, wherein:
- the filter, the encryption unit, the processor and the message sending unit are included in a first enclosure; and
- the data diode circuit is included in a second enclosure;
- wherein, the first enclosure and second enclosure are geographically distinct from each other such that no electromagnetic radiation is picked-up from the first enclosure to the second enclosure.

* * * * *